United States Patent
Zhang et al.

(10) Patent No.: US 10,707,503 B2
(45) Date of Patent: Jul. 7, 2020

(54) PROTON EXCHANGE MEMBRANE FUEL CELL WITH A MOVABLE MEMBRANE ELECTRODE ASSEMBLY DEVICE

(71) Applicants: Tsinghua University, Beijing (CN); HON HAI PRECISION INDUSTRY CO., LTD., New Taipei (TW)

(72) Inventors: Li-Na Zhang, Beijing (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/448,109

(22) Filed: Jun. 21, 2019

(65) Prior Publication Data
US 2019/0305343 A1 Oct. 3, 2019

Related U.S. Application Data

(63) Continuation of application No. 15/444,183, filed on Feb. 27, 2017, now Pat. No. 10,418,652.

(30) Foreign Application Priority Data

Mar. 31, 2016 (CN) .......................... 2016 1 0197850

(51) Int. Cl.
*H01M 8/04291* (2016.01)
*H01M 8/0276* (2016.01)
*H01M 8/04119* (2016.01)
*H01M 8/04082* (2016.01)
*H01M 8/04223* (2016.01)
(Continued)

(52) U.S. Cl.
CPC ......... *H01M 8/04291* (2013.01); *H01M 4/96* (2013.01); *H01M 8/02* (2013.01); *H01M 8/0278* (2013.01); *H01M 8/04* (2013.01); *H01M 8/04156* (2013.01); *H01M 8/04201* (2013.01); *H01M 8/04231* (2013.01); *H01M 8/1009* (2013.01); *H01M 8/16* (2013.01);
(Continued)

(58) Field of Classification Search
CPC .. H01M 8/04291; H01M 8/2475; H01M 8/16; H01M 8/1009; H01M 8/04231; H01M 8/04201; H01M 8/04156; H01M 8/0278; H01M 8/04; H01M 8/02; H01M 4/96; H01M 2008/1095; H01M 8/1004; Y02E 60/527
USPC ........................................................ 429/444
See application file for complete search history.

(56) References Cited

U.S. PATENT DOCUMENTS 7,410,714 B1 * 8/2008 Burke ............... H01M 8/04007
429/418

* cited by examiner

*Primary Examiner* — Gary D Harris
(74) *Attorney, Agent, or Firm* — ScienBizi, P.C.

(57) ABSTRACT

The disclosure relates to a proton exchange membrane fuel cell. The fuel cell includes: a container, wherein the container includes a reacting room, a fuel room connected to the reacting room through a fuel inputting hole, a fuel inputting door located on the fuel inputting hole, a waste collecting room connected to the reacting room through a waste outputting hole, a waste outputting door located on the waste outputting hole; a membrane electrode assembly device located in the reacting room, wherein the reacting room is divided into an anode electrode space and a cathode electrode space connected to the outside through a pipe, the (Continued)

volume of the anode electrode space and the cathode electrode space can be changed by moving the membrane electrode assembly device.

14 Claims, 7 Drawing Sheets

(51) Int. Cl.
| | | |
|---|---|---|
| *H01M 8/1009* | (2016.01) | |
| *H01M 8/16* | (2006.01) | |
| *H01M 8/2475* | (2016.01) | |
| *H01M 4/96* | (2006.01) | |
| *H01M 8/02* | (2016.01) | |
| *H01M 8/04* | (2016.01) | |
| *H01M 8/1018* | (2016.01) | |

(52) U.S. Cl.
CPC .. *H01M 8/2475* (2013.01); *H01M 2008/1095* (2013.01); *Y02E 60/527* (2013.01)

PROTON EXCHANGE MEMBRANE FUEL CELL WITH A MOVABLE MEMBRANE ELECTRODE ASSEMBLY DEVICE

CROSS-REFERENCE TO RELATED APPLICATIONS

This application is a continuation application of U.S. patent application Ser. No. 15/444,183, filed on Feb. 27, 2017, entitled "PROTON EXCHANGE MEMBRANE FUEL CELL," which claims all benefits accruing under 35 U.S.C. § 119 from China Patent Application No. 201610197850.4, filed on Mar. 31, 2016, in the China Intellectual Property Office, the contents of which are hereby incorporated by reference.

FIELD

The subject matter herein generally relates to fuel cell, and particularly, to a proton exchange membrane fuel cell.

BACKGROUND

Fuel cells can generally be classified into alkaline, solid oxide, and proton exchange membrane fuel cells. The proton exchange membrane fuel cell has received increasingly more attention and has developed rapidly in recent years.

Typically, the proton exchange membrane fuel cell includes a number of separated fuel cell work units. Each work unit includes a fuel cell membrane electrode assembly (MEA), flow field plates (FFP), current collector plates (CCP). However, the traditional proton exchange membrane fuel cell also need related support equipment, such as blowers, valves, and pipelines, to input and output the fuel and oxygen gas. Thus, the traditional proton exchange membrane fuel cell has complicated structure and relatively high cost.

What is needed, therefore, is to provide a proton exchange membrane fuel cell which can overcome the shortcomings as described above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
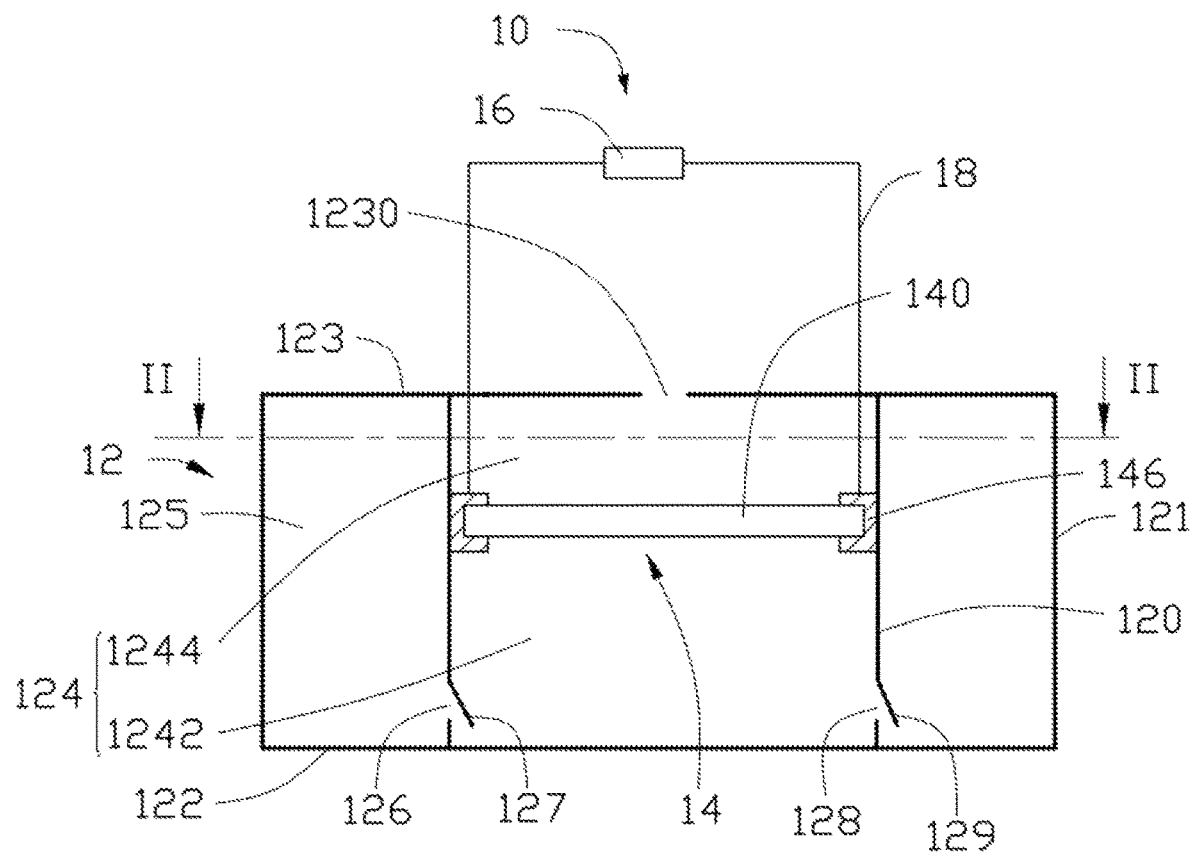
FIG. 1 is a schematic view of one embodiment of a fuel cell.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale, and the proportions of certain parts may be exaggerated to be better illustrate details and features. The description is not to considered as limiting the scope of the embodiments described herein.

Several definitions that apply throughout this disclosure will now be presented.

The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like. It should be noted that references to "an" or "one" embodiment in this disclosure are not necessarily to the same embodiment, and such references mean at least one.

Figure 2:
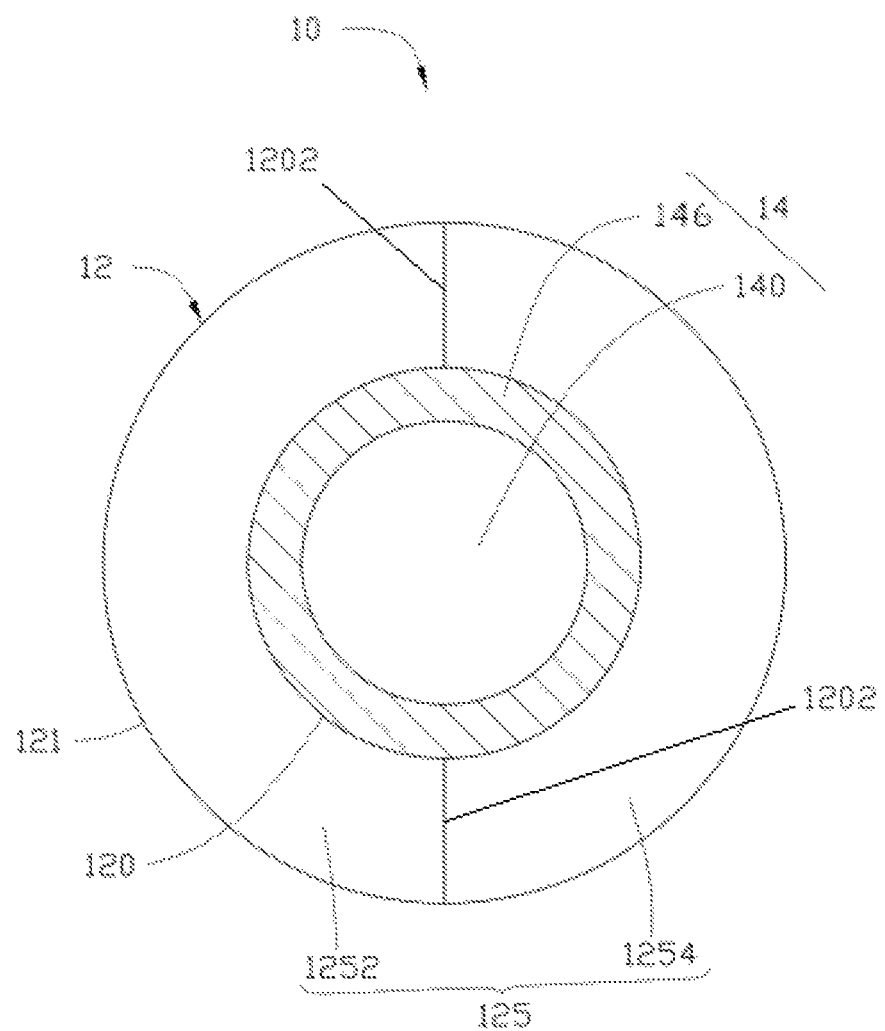
FIG. 2 is a schematic, cross-sectional view, along a line II-II of FIG. 1.

Referring to FIGS. 1 and 2, a proton exchange membrane fuel cell 10 of one embodiment is provided. The proton exchange membrane fuel cell 10 includes a container 12 and a membrane electrode assembly device 14 located in the container 12. The membrane electrode assembly device 14 includes a gasket ring 146 defining a through hole and a membrane electrode assembly 140 located on the gasket ring 146 and covering the through hole.

The container 12 includes an annular internal wall 120 and an annular external wall 121 surrounding the annular internal wall 120. The annular internal wall 120 and the annular external wall 121 are connected to each other by a bottom wall 122 and a top wall 123. A reacting room 124 is defined by the annular internal wall 120. A storage room 125 is defined between the annular internal wall 120 and the annular external wall 121. The storage room 125 is divided into a fuel room 1252 and a waste room 1254. The fuel room 1252 is in communication with the reacting room 124 through a fuel inputting hole 126, and the waste room 1254 is in communication with the reacting room 124 through a waste outputting hole 128. A fuel inputting door 127 is located on the fuel inputting hole 126, and a waste outputting door 129 is located on the waste outputting hole 128. A gas exchange hole 1230 is defined on the top wall 123 and used to communicate the reacting room 124 to the outside atmosphere. The shape and size of the gas exchange hole 1230 is not limited.

Figure 3:
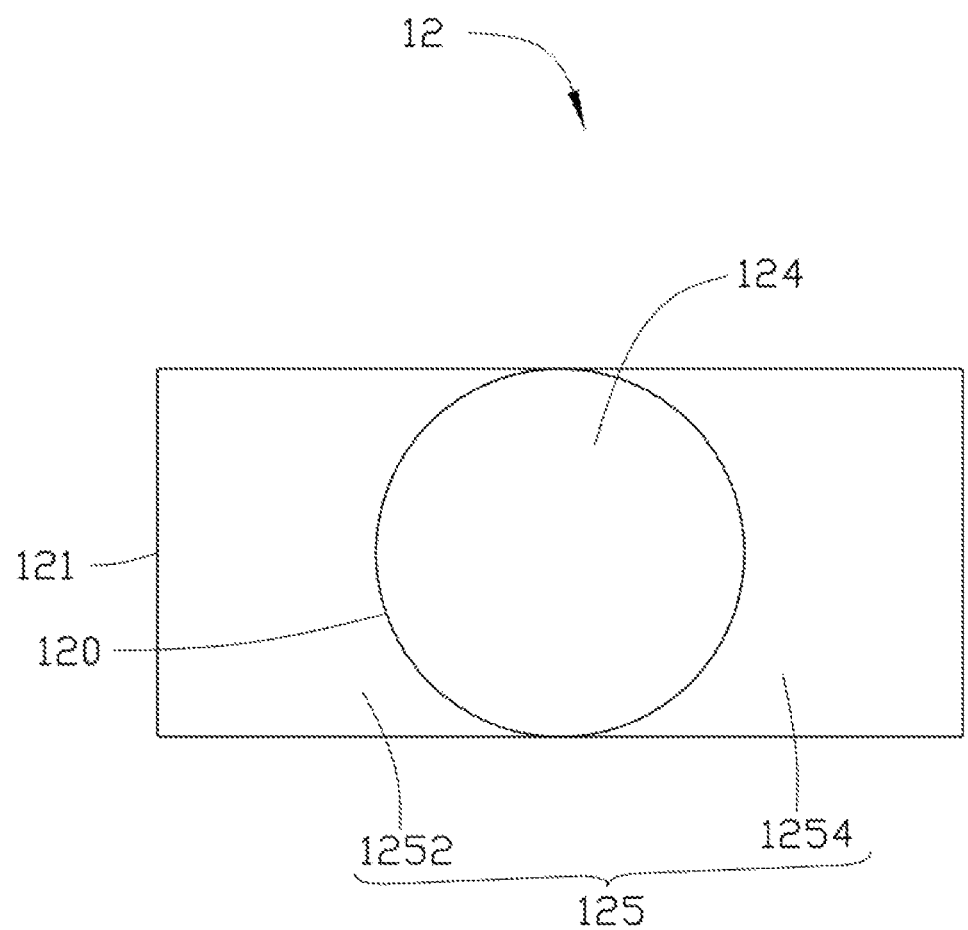
FIG. 3 is a schematic view of one embodiment of a container of a fuel cell.

The annular internal wall 120 and the annular external wall 121 can have a cross-section shape, such as round, ellipse, triangle, square, or any multilateral shape. The cross section shapes of the annular internal wall 120 and the annular external wall 121 can be the same as shown in FIG. 2 or different as shown in FIG. 3. Referring to FIG. 2, in one embodiment, the annular internal wall 120 and the annular external wall 121 can be substantially cconcentric cylinders spaced from each other. The space between the annular internal wall 120 and the annular external wall 121 is divided into the fuel room 1252, and the waste room 1254 by two plates 1202. Referring to FIG. 3, in one embodiment, the annular internal wall 120 and the annular external wall 121 can be tangent and in direct contact with each other at two places so that the space therebetween is divided into the fuel room 1252 and the waste room 1254.

The fuel inputting door 127 is fixed on the inner surface of the reacting room 124. The fuel inputting door 127 would be closed when the pressure of the reacting room 124 is higher than the pressure of the fuel room 1252, and the fuel inputting door 127 would be open when the reacting room 124 is lower than the pressure of the fuel room 1252. The waste outputting door 129 is fixed on the inner surface of the waste room 1254. The waste outputting door 129 would be open when the pressure of the reacting room 124 is higher than the pressure of the waste room 1254, and the waste outputting door 129 would be closed when the reacting room 124 is lower than the pressure of the waste room 1254. The shape and size of the container 12 is not limited as long as the container 12 can be divided into the reacting room 124, the fuel room 1252 and the waste room 1254. The container 12 can have a plurality of fuel rooms 1252 and a plurality of waste rooms 1254.

The membrane electrode assembly device 14 is located in the reacting room 124 and divides the reacting room 124 into an anode electrode space 1242 and a cathode electrode space 1244. The membrane electrode assembly device 14 is movable in the reacting room 124 so that the volume of the anode electrode space 1242 and the cathode electrode space 1244 is variable.

Figure 4:
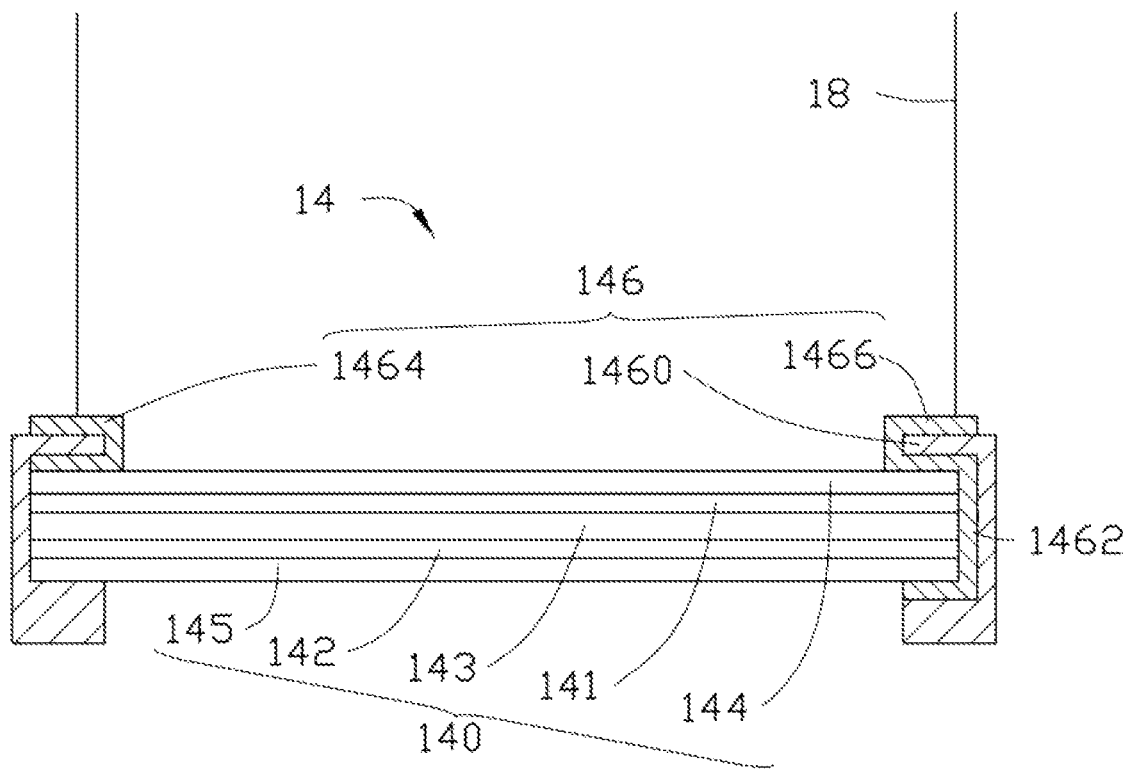
FIG. 4 is a schematic view of one embodiment of a membrane electrode assembly device of a fuel cell.

Referring to FIG. 4, in one embodiment, the membrane electrode assembly 140 includes a proton exchange membrane 143, an anode electrode 142 and a cathode electrode 141. The proton exchange membrane 143 comprises a first surface and a second surface opposite to the first surface. The anode electrode 142 is located on the first surface and in the anode electrode space 1242, and the cathode electrode 141 is located on the second surface and in the cathode electrode space 1244. Alternatively, the membrane electrode assembly 140 can also include an anode current collector 145 located on the anode electrode 142 and a cathode current collector 144 located on the cathode electrode 141.

The material of the proton exchange membrane 143 can be perfluorosulfonic acid, polystyrene sulfonic acid, polystyrene trifluoroacetic acid, phenol formaldehyde resin acid, or hydrocarbons. In one embodiment, both the anode electrode 142 and the cathode electrode 141 includes a gas diffusion layer and catalyst layer located on the gas diffusion layer to form a double layer structure. In one embodiment, both the anode electrode 142 and the cathode electrode 141 includes a gas diffusion layer and a catalyst material dispersed in the gas diffusion layer to form a single layer composite. The gas diffusion layer can be a carbon nanotube layer or a carbon fiber layer. The catalyst material of the cathode electrode 141 can be noble metal particles, such as platinum particles, gold particles or ruthenium particles. The catalyst material of the anode electrode 142 can be selected according to the fuel. When the fuel is biofuel, such as glucose, the catalyst material of the anode electrode 142 is biofuel catalyst, such as glucose oxidase. When the fuel is ether, the catalyst material of the anode electrode 142 is a noble metal. The cathode current collector 144 and the anode current collector 145 are metal mesh or metal layer having through holes and used to collect electrons or protons. Furthermore, the cathode current collector 144 and the anode current collector 145 can protect the entire membrane electrode assembly 140 during the membrane electrode assembly 140 moving.

In one embodiment, the proton exchange membrane 143 is a perfluorosulfonic acid film. The cathode electrode 141 includes a first carbon nanotube layer and platinum particles dispersed in the first carbon nanotube layer. The size of the platinum particles is in a range from about 1 nanometer to abut 10 nanometers. The distribution of the platinum particles is less than 0.5 mg/cm$^2$ (milligram per square centimeter). The anode electrode 142 includes a second carbon nanotube layer and enzymatic catalyst or microbe dispersed in the second carbon nanotube layer. The enzymatic catalyst can be oxidase or dehydrogenase. The enzymatic catalyst is dispersed on the surface of the carbon nanotubes of the carbon nanotube layer. The carbon nanotubes of the carbon nanotube structure include a plurality of carboxyls or hydroxyls. The enzymatic catalyst is attached to the surface of the carbon nanotubes via the carboxyls or hydroxyls thereof. Both the cathode current collector 144 and the anode current collector 145 are copper mesh.

The gasket ring 146 is used to support the membrane electrode assembly 140 and seal the gaps between the annular internal wall 120 and the membrane electrode assembly 140. The gasket ring 146 includes an annular body 1460, a cathode connector 1464 located on the annular body 1460, and an anode connector 1466 located on the annular body 1460. The annular body 1460 and the reacting room 124 have the same cross section shapes and size. The outer side surface of the annular body 1460 is in direct contact with the inner side surface of the reacting room 124. The annular body 1460 defines an annular groove 1462 on the inner surface of the annular body 1460 so that the membrane electrode assembly 140 can be partially embedded in the annular groove 1462. The thickness and size of the gasket ring 146 can be selected according to need. The material of the gasket ring 146 can be a polymer, such as rubber.

The cathode connector 1464 is electrically connected to the cathode electrode 141, and the anode connector 1466 is electrically connected to the anode electrode 142. In one embodiment, the cathode connector 1464 is electrically connected to the cathode electrode 141 via the cathode current collector 144, and the anode connector 1466 is electrically connected to the anode electrode 142 through the anode current collector 145. The cathode connector 1464 and the anode connector 1466 are partially exposed to the cathode electrode space 1244 and can be electrically connected to a load 16 by wires 18.

In one embodiment, both the cathode connector 1464 and the anode connector 1466 are a metal layer. The annular groove 1462 comprises a top inner surface and a bottom inner surface. The cathode connector 1464 is located on the top outer surface of the annular body 1460 and extend to the top inner surface of the annular groove 1462 to in direct contact with the cathode current collector 144. The anode connector 1466 is located on the top outer surface of the annular body 1460 and extend to the bottom inner surface of the annular groove 1462 to in direct contact with the anode current collector 145. The anode connector 1466 should be insulated from the cathode current collector 144 and the cathode electrode 141 by an insulating layer.

In working process of the proton exchange membrane fuel cell 10, the cathode connector 1464 and the anode connector 1466 are electrically connected to the load 16 via two wires 18. When the membrane electrode assembly device 14 moves toward the top wall 123, the volume of the anode electrode space 1242 increases, and pressure of the anode electrode space 1242 decrease. The fuel inputting door 127 would be open, and the outputting door 129 would be closed. The glucose biofuel enters the anode electrode space 1242 from the fuel room 1252. At the same time, the waste gas of the cathode electrode space 1244 is exhausted through the gas exchange hole 1230 because the pressure of the cathode electrode space 1244 increase. When the membrane electrode assembly device 14 moves toward the bottom wall 122, the volume of the anode electrode space 1242 decreases, and pressure of the anode electrode space 1242 increase. The fuel inputting door 127 would be closed, and the outputting door 129 would be open. The waste biofuel enters the waste room 1254 from the anode electrode space 1242. At the same time, the air outside of the reacting room 124 enters the cathode electrode space 1244 through the gas exchange hole 1230 because the pressure of the cathode electrode space 1244 decrease.

On the side of the anode electrode 142, the glucose biofuel is applied and decomposed by the enzymatic catalyst to form electrons and protons (H). The protons are transferred from the anode electrode 142 to the cathode electrode 141 by the proton exchange membrane 143. At the same time, the electrons arrive at the cathode electrode 141 by the external electrical circuit. On the side of the cathode electrode 141, oxygen is applied and reacts with the protons and electrons as shown in the following equation: $1/2O_2 + 2H^+ + 2e \rightarrow H_2O$. In the process, a potential difference is generated, and a current flows through the load 16.

Because the fuel and oxygen gas are input and output by moving the membrane electrode assembly device 14, the proton exchange membrane fuel cell 10 does not need the support equipment, such as blowers, valves, and pipelines. The moving direction of the membrane electrode assembly device 14 can be vertical or horizontal. In one embodiment, the angle between the moving direction of the membrane electrode assembly device 14 and the horizontal plane can be less than 90 degrees, such as in a range from about 30 degrees to about 60 degrees. Thus, the water resulted from the reaction can be easy output through the.

Figure 5:
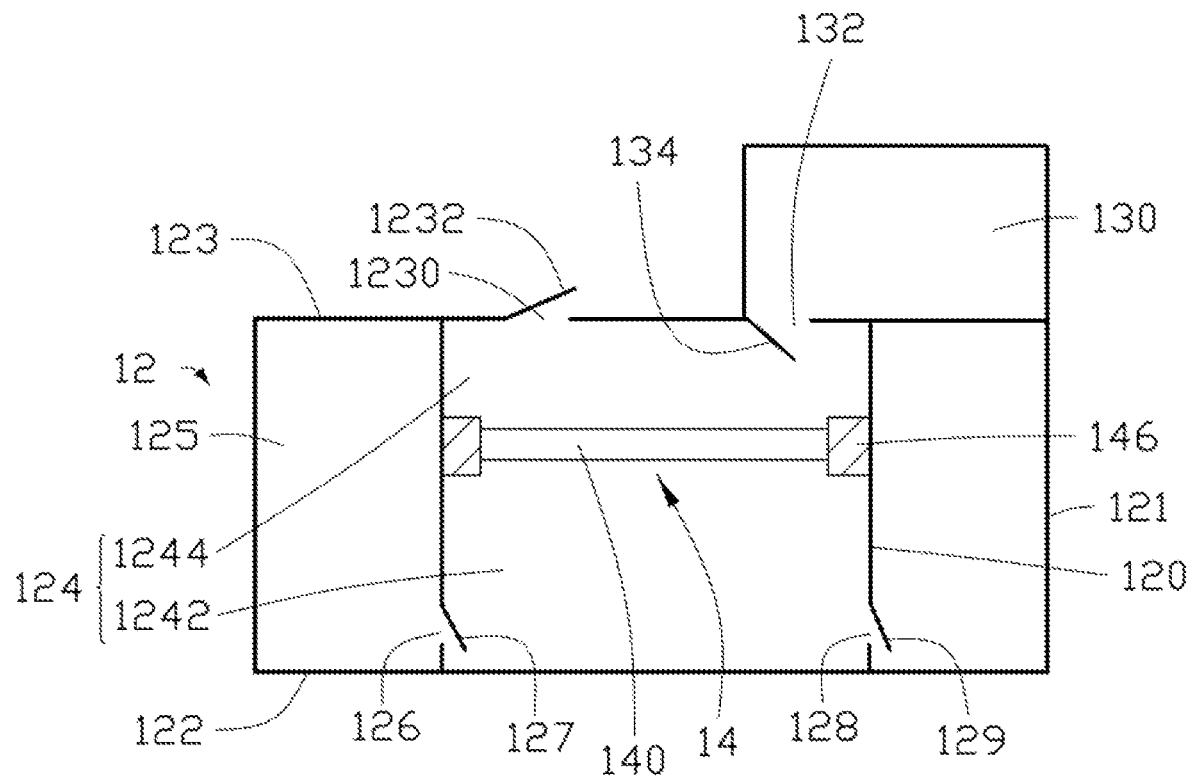
FIG. 5 is a schematic view of another embodiment of a fuel cell.

Referring to FIG. 5, a proton exchange membrane fuel cell 10A of another embodiment is provided. The proton exchange membrane fuel cell 10A includes the container 12 and the membrane electrode assembly device 14 located in the container 12. The membrane electrode assembly device 14 includes a gasket ring 146 defining a through hole and a membrane electrode assembly 140 located on the gasket ring 146 and covering the through hole.

The proton exchange membrane fuel cell 10A is similar to the proton exchange membrane fuel cell 10 above except that the proton exchange membrane fuel cell 10A further includes an oxygen room 130, the oxygen room 130 is in communication with the cathode electrode space 1244 through a gas inputting hole 132, and a gas inputting door 134 is located on the gas inputting hole 132. The gas inputting door 134 fixed on the inner surface of the cathode electrode space 1244. The oxygen room 130 is above the cathode electrode space 1244, and the gas inputting hole 132 is formed on the top wall 123.

The gas inputting door 134 would be closed when the pressure of the cathode electrode space 1244 is higher than the pressure of the oxygen room 130, and the gas inputting door 134 would be open when the pressure of the cathode electrode space 1244 is lower than the pressure of the oxygen room 130. A gas outputting door 1232 is located on the gas exchange hole 1230 so that the gas exchange hole 1230 is only used to exhaust waste gas. The gas outputting door 1232 is fixed on the outer surface of the top wall 123. The gas outputting door 1232 would be open when the pressure of the cathode electrode space 1244 is higher than the pressure of the atmosphere, and the gas outputting door 1232 would be closed when the pressure of the cathode electrode space 1244 is lower than the pressure of the atmosphere.

Figure 6:
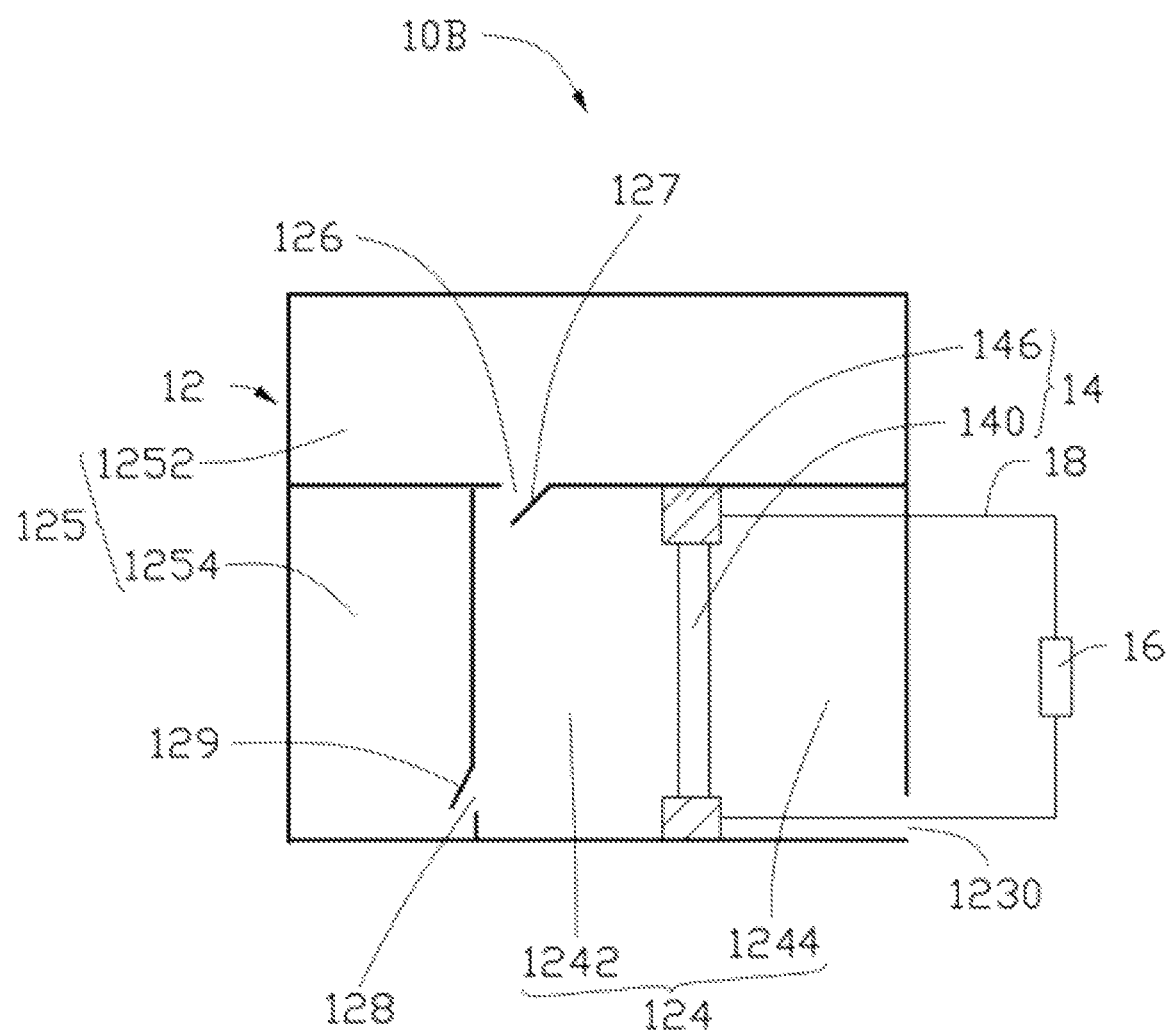
FIG. 6 is a schematic view of another embodiment of a fuel cell.

Referring to FIG. 6, a proton exchange membrane fuel cell 10B of another embodiment is provided. The proton exchange membrane fuel cell 10B includes the container 12 and the membrane electrode assembly device 14 located in the container 12. The membrane electrode assembly device 14 includes a gasket ring 146 defining a through hole and a membrane electrode assembly 140 located on the gasket ring 146 and covering the through hole.

The proton exchange membrane fuel cell 10B is similar as the proton exchange membrane fuel cell 10 above except that the moving direction of the membrane electrode assembly device 14 is horizontal. The fuel room 1252 is above the reacting room 124 and the fuel inputting hole 126 is located at a common wall of the fuel room 1252 and the anode electrode space 1242. The bottom wall of the fuel room 1252 is also the top wall of the reacting room 124. The waste room 1254 is adjacent to and communicated to the anode electrode space 1242 and under the fuel room 1252. The fuel in the fuel room 1252 is ethanol gas. The catalyst of the anode electrode 142 is noble metal particles. The gas exchange hole 1230 is located at the bottom corner of the cathode electrode space 1244. Because the membrane electrode assembly 140 is vertical, the water resulted from the reaction could flow out of the cathode electrode space 1244 from the gas exchange hole 1230.

Figure 7:
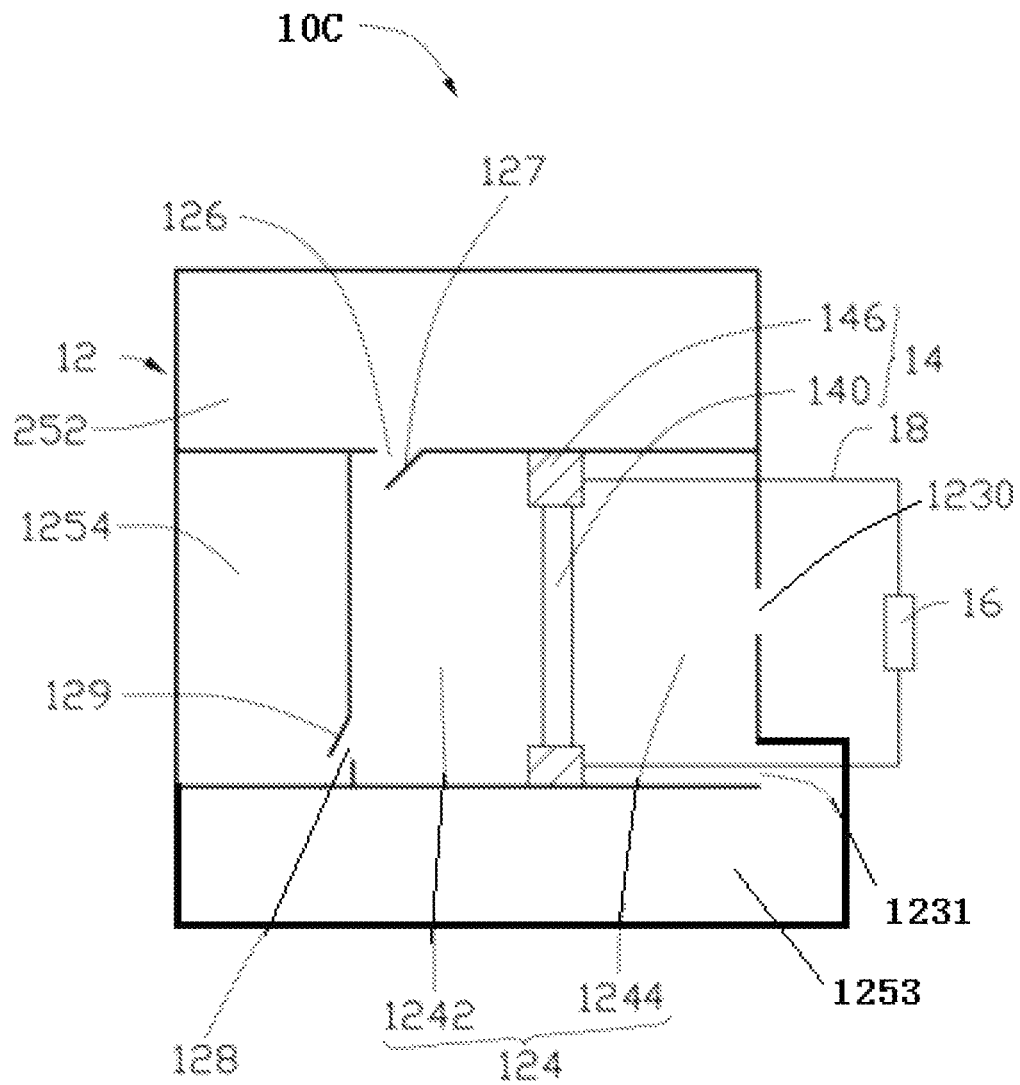
FIG. 7 is a schematic view of another embodiment of a fuel cell.

Referring to FIG. 7, a proton exchange membrane fuel cell 10C of another embodiment is provided. The proton exchange membrane fuel cell 10C is similar as the proton exchange membrane fuel cell 10B above except that the proton exchange membrane fuel cell 10C further includes a waste water collecting room 1253 under the reacting room 124. The waste water collecting room 1253 is communicated to the cathode electrode space 1244 through a waste water outputting hole 1231 at the bottom corner of the cathode electrode space 1244. The gas exchange hole 1230 is spaced from the waste water outputting hole 1231.

The embodiments shown and described above are only examples. Even though numerous characteristics and advantages of the present technology have been set forth in the forego description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

Depending on the embodiment, certain of the steps of methods described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:
1. A proton exchange membrane fuel cell, comprising:
   a container, wherein the container comprise:
      an annular internal wall, wherein a reacting room is defined by the annular internal wall;
      an annular external wall surrounding the annular internal wall, wherein a storage room is defined between the annular internal wall and the annular external wall and divided into a fuel room and a waste room, the fuel room is in communication with the reacting room through a fuel inputting hole, and the waste room is in communication with the reacting room through a waste outputting hole;
a bottom wall connecting the annular internal wall and the annular external wall;
a top wall connecting the annular internal wall and the annular external wall,
wherein a gas exchange hole is defined on the top wall;
a fuel inputting door located on the fuel inputting hole; and
a waste outputting door located on the waste outputting hole; and
a membrane electrode assembly device located in the reacting room and dividing the reacting room into a first electrode space and a second electrode space, wherein the membrane electrode assembly device is movable in the reacting room so that volumes of the first electrode space and the second electrode space is variable, and the second electrode space is in communication with an outside atmosphere through the gas exchange hole.

2. The proton exchange membrane fuel cell of claim 1, wherein the membrane electrode assembly device comprises a gasket ring defining a through hole and a membrane electrode assembly located on the gasket ring and covering the through hole.

3. The proton exchange membrane fuel cell of claim 2, wherein the membrane electrode assembly comprises an anode current collector, an anode electrode, a proton exchange membrane, a cathode electrode, and a cathode current collector.

4. The proton exchange membrane fuel cell of claim 3, wherein the gasket ring comprises an annular body, a cathode connector located on the annular body, and an anode connector located on the annular body.

5. The proton exchange membrane fuel cell of claim 4, wherein the anode connector is electrically connected to the anode electrode, and the cathode connector is electrically connected to the cathode electrode.

6. The proton exchange membrane fuel cell of claim 5, wherein the anode connector and the cathode connector are partially exposed to the second electrode space.

7. The proton exchange membrane fuel cell of claim 4, wherein the annular body defines an annular groove on an inner surface of the annular body and the membrane electrode assembly is partially embed in the annular groove.

8. The proton exchange membrane fuel cell of claim 1, wherein when the membrane electrode assembly device moves toward the gas exchange hole, the volume of the first electrode space increases and the volume of the second electrode space decreases, a pressure of the first electrode space decrease and a pressure of the second electrode space increase, the fuel inputting door is open and the outputting door is closed so that fuel enters the first electrode space from the fuel room, and waste gas of the second electrode space is exhausted through the gas exchange hole; and
when the membrane electrode assembly device moves away from the gas exchange hole, the volume of the first electrode space decreases and the volume of the second electrode space increases, the pressure of the first electrode space increase and the pressure of the second electrode space decrease, the fuel inputting door is closed and the outputting door is open so that waste fuel enters the waste room from the first electrode space, and the air outside of the reacting room enters the second electrode space through the gas exchange hole.

9. The proton exchange membrane fuel cell of claim 8, wherein the fuel inputting door is fixed on the inner surface of the reacting room, the fuel inputting door is closed when the pressure of the first electrode space is higher than the pressure of the fuel room, and the fuel inputting door is open when the pressure of the first electrode space is lower than the pressure of the fuel room; and
the waste outputting door is fixed on the inner surface of the waste room, the waste outputting door is open when the pressure of the first electrode space is higher than the pressure of the waste room, and the waste outputting door is closed when the pressure of the first electrode space is lower than the pressure of the waste room.

10. The proton exchange membrane fuel cell of claim 1, further comprising:
an oxygen room in communication with the second electrode space through a gas inputting hole;
a gas inputting door located on the gas inputting hole; and
a gas outputting door located on the gas exchange hole;
wherein when the membrane electrode assembly device moves toward the gas exchange hole, the volume of the first electrode space increases and the volume of the second electrode space decreases, a pressure of the first electrode space decrease and a pressure of the second electrode space increase, the fuel inputting door is open and the outputting door is closed so that fuel enters the first electrode space from the fuel room, and the gas inputting door is closed and the gas outputting door is open so that waste gas of the second electrode space is exhausted through the gas outputting door; and
when the membrane electrode assembly device moves away from the gas exchange hole, the volume of the first electrode space decreases and the volume of the second electrode space increases, the pressure of the first electrode space increase and the pressure of the second electrode space decrease, the fuel inputting door is closed and the outputting door is open so that waste fuel enters the waste room from the first electrode space, and the gas outputting door is closed and the gas inputting door is open so that oxygen gas enters the second electrode space through the gas inputting door.

11. The proton exchange membrane fuel cell of claim 10, wherein the fuel inputting door is fixed on the inner surface of the reacting room, the fuel inputting door is closed when the pressure of the first electrode space is higher than the pressure of the fuel room, and the fuel inputting door is open when the pressure of the first electrode space is lower than the pressure of the fuel room;
the waste outputting door is fixed on the inner surface of the waste room, the waste outputting door is open when the pressure of the first electrode space is higher than the pressure of the waste room, and the waste outputting door is closed when the pressure of the first electrode space is lower than the pressure of the waste room;
the gas inputting door is fixed on the inner surface of the second electrode space, the gas inputting door is closed when the pressure of the second electrode space is higher than the pressure of the oxygen room, and the gas inputting door is open when the pressure of the second electrode space is lower than the pressure of the oxygen room; and the gas outputting door is fixed on the outer surface of the second electrode space, the gas outputting door is open when the pressure of the second electrode space is higher than the pressure of the atmosphere, and the gas outputting door is closed when the pressure of the second electrode space is lower than the pressure of the atmosphere.

12. The proton exchange membrane fuel cell of claim 1, wherein the fuel room is above the reacting room and the fuel inputting hole is located at a common wall of the fuel room and the first electrode space, and the waste room is adjacent to and communicated to the first electrode space and under the fuel room.

13. The proton exchange membrane fuel cell of claim 12, wherein the membrane electrode assembly is vertical and moveable along the horizontal direction, and the gas exchange hole is located at the bottom corner of the second electrode space so that water caused in the second electrode space flow out of the second electrode space from the gas exchange hole.

14. The proton exchange membrane fuel cell of claim 12, further comprising a waste water collecting room under the reacting room and communicated to the second electrode space through a waste water outputting hole at the bottom corner of the second electrode space; and the gas exchange hole is spaced from the waste water outputting hole.

\* \* \* \* \*